Nov. 2, 1926.
W. B. SCHULTE
BATTERY CONTAINER
Filed Dec. 14, 1921    2 Sheets-Sheet 1
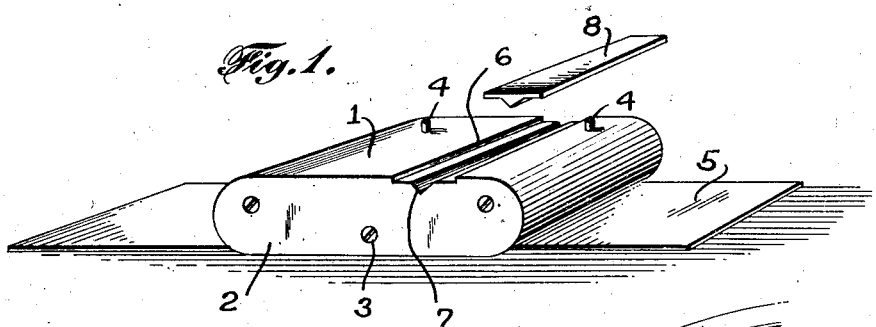
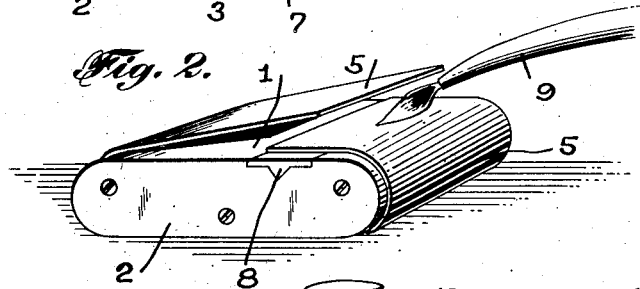
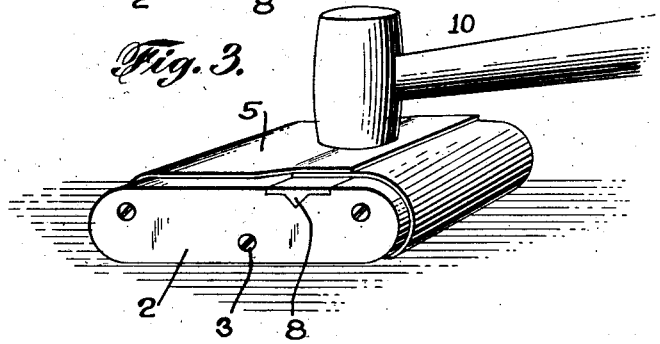
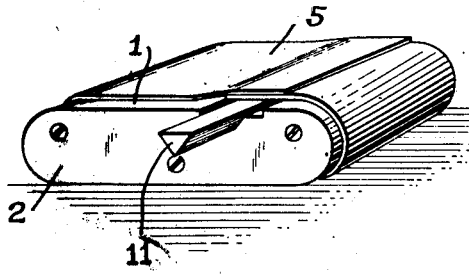
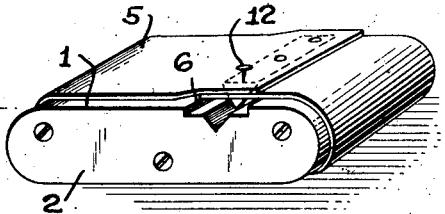
INVENTOR
WALTER B. SCHULTE
BY
ATTORNEYS Nov. 2, 1926.
W. B. SCHULTE
BATTERY CONTAINER
Filed Dec. 14, 1921       2 Sheets-Sheet 2
1,605,620
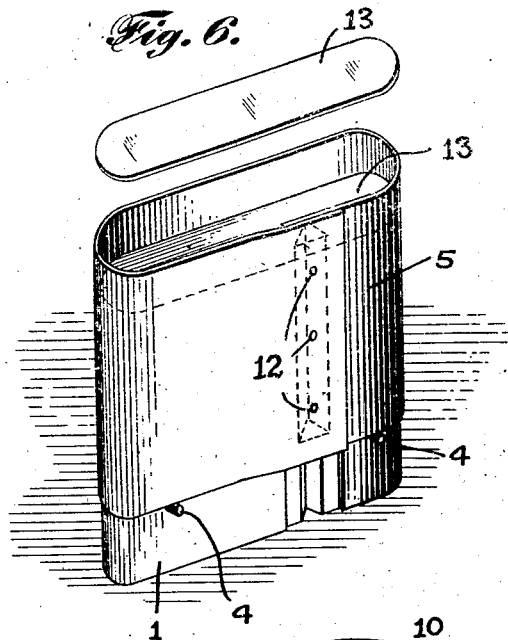
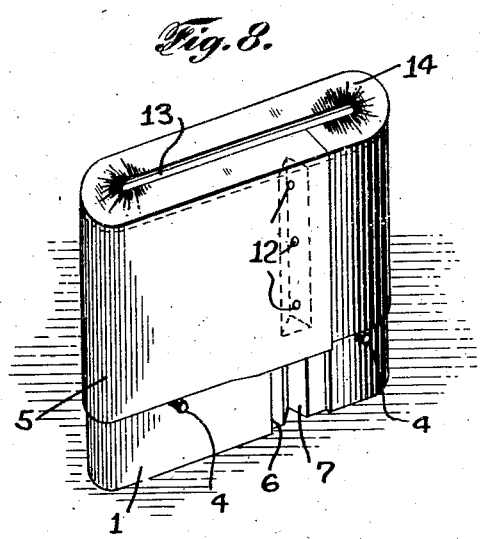
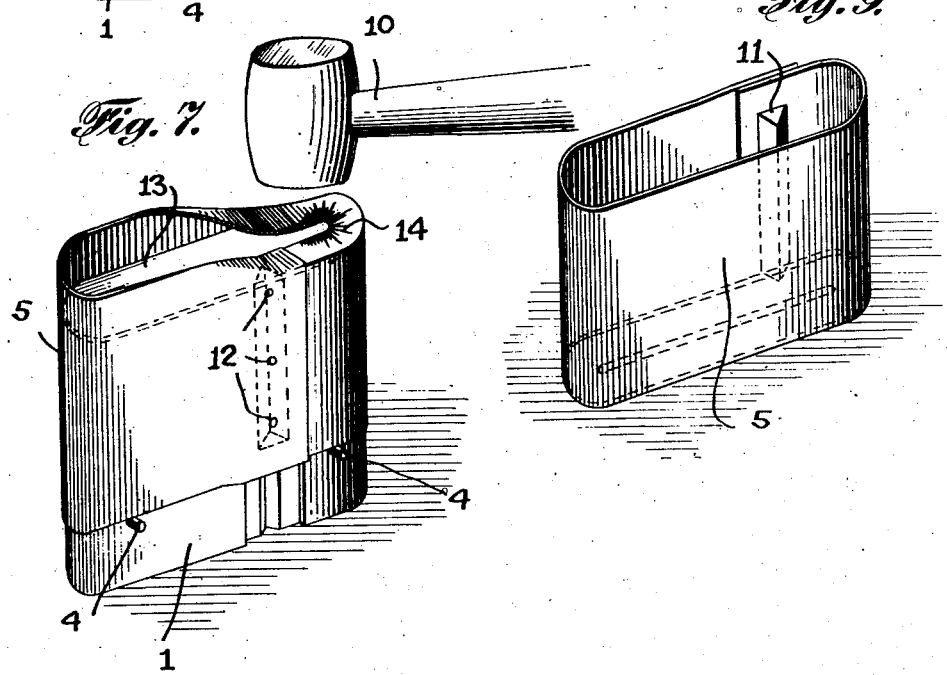
INVENTOR
WALTER B. SCHULTE
BY
ATTORNEYS Patented Nov. 2, 1926.

1,605,620

UNITED STATES PATENT OFFICE.

WALTER B. SCHULTE, OF MADISON, WISCONSIN, ASSIGNOR TO BURGESS BATTERY COMPANY, A CORPORATION OF WISCONSIN.

BATTERY CONTAINER.

Application filed December 14, 1921. Serial No. 522,299.

My invention is an improvement in battery containers, and methods of making the same, and relates particularly to a container for holding a plurality of separate cells. Dry cell batteries are sometimes marketed in assemblies of a plurality of individual cells, connected in series. The assemblies are held in a container of paper or the like, waterproofed, and with one end open. The end is sealed with pitch, asphaltum or the like, or with a rosin base containing wax.

The seal fills the open end of the container, and completely covers the tops of the cells, adhering to the container walls which project above the tops of the cells. Two terminals are left projecting through the seal, to permit connection to be made with the battery. The containers are usually held together by glue, and are waterproofed by dipping them in paraffine before or after the cells are assembled.

The paraffine however, does not stand up for any length of time, nor does the glue hold, when the containers are subjected to the continued action of moisture. The material of the container becomes soaked, the fibers lose cohesion and fall apart, the glued laps separate, and the cells short circuit because of the moisture which is admitted to them.

In the present invention I provide a container composed of felt of the character made for use as roofing, and composed of suitable fiber, impregnated with tar or asphaltum. The material, that is the impregnated felt, is molded into shape and held together by the contained tar or asphaltum, softened by heat to the proper consistency. The method I employ in shaping provides for a container of exact dimensions as regards capacity, to hold a selected number of batteries in close relation, and extremely resistant to moisture, and wherein the lapped portions hold tenaciously. In addition, the seal of asphaltum or pitch at the open end of the container is exceptionally close and tight, because of the close cohesion and intimate union between the material of the seal, and the material with which the felt is impregnated. A container made in accordance with the method is waterproof, highly insulating, flexible, and strong, and the joint or lap is moistureproof.

In the drawings—

Figure 1 is a perspective view showing the form about which the container is shaped, with the sheet of material in place, showing the first step of the operation, Figure 2 is a similar view showing the second step, Figure 3 is a perspective view showing the step of connecting the lapped ends, Figure 4 is a similar view with the anvil removed, and with the nailing strip in place, Figure 5 is a similar view showing the connecting of the nailing strip to the container, Figures 6, 7 and 8 are perspective views showing the various steps in the forming of the closed end of the container, Figure 9 is a perspective view of the completed container.

In the present embodiment of the invention, I provide a form 1 of suitable material, as for instance wood, of a size in cross-section corresponding to the cross sectional area of the container to be made, and shaped in cross-section to correspond with the interior of the container. The form is of greater length than the depth of the completed container, and a plate 2 of metal is secured to one end of the form, by means of screws 3 or the like. Near the opposite end of one face, the form is provided with spring supported pins 4, which normally extend above the surface of the form, but may be depressed below when desired. These pins 4 are gauge pins, and are spaced from the outer face of the plate 2, a distance corresponding to the depth of the completed container. The arrangement is such that when one edge of the sheet 5 of material from which the container is formed abuts these pins, the opposite edge will extend beyond the plate 2 a sufficient distance to form the desired lap at the end.

The form is also provided on the face having the pins with a longitudinal groove extending from end to end of the form, and through the plate 2, and having the cross-sectional shape shown. The groove may be described as composed of a portion 6 which is rectangular in cross-section and a portion 7 which is triangular in cross-section, the portion 7 being at the center of the portion 6 and having its sides spaced from the sides of the said portion. A similarly shaped plate 8 is provided for filling the groove, the plate 8 being shaped to fill the groove, and the said plate is an anvil upon which the lapped ends of the sheet 5 are sealed.

In shaping the container, the sheet 5 of material, which is preferably of felt, such as is designed for use in making roofing material, impregnated with pitch, asphaltum or the like is laid upon a suitable support, as for instance a table or bench, and the form for instance 1, with the anvil 8 in place, is laid upon the sheet as shown in Figure 1. The ends of the sheet are now lapped upon the upper face of the form, as shown in Figure 2, with the ends of the sheet at the anvil 8, it being understood that the sheet is of a length to fit about the form with the ends lapping. The asphaltum or pitch at the adjacent faces of the lapping ends is now softened by heat, as for instance a hand operated gas flame indicated at 9, and the lapping ends are pressed together. By means of a suitable tool, as for instance a mallet indicated at 10 in Figure 3, the lapped ends are firmly connected, being hammered together, until the hot pitch or asphaltum is thoroughly driven into the pores of the lapping ends.

Next the anvil 8 is slipped out of the groove 6—7, and a strip 11 of wood, of a length corresponding to the height of the battery to be held in the container, is inserted in the place of the anvil. This strip 11 is of a size to fill the portion 7 of the groove, and to abut with one of its surfaces smoothly against the lapped ends, as shown in Figure 4. The lapped ends are now secured to the strip 11, by means of tacks 12 or the like, as shown in Figure 5, and the tube formed by the lapping of the ends of the sheet is slipped longitudinally of the form, until the gauge pins 4, which, heretofore have been held in depressed position by the sheet 5, may project, and the inner end of the tube is seated against the gauge pins. A portion of the opposite end of the tube will extend beyond the anvil 2, as shown in Figure 6, and an end piece or bottom 13, of the same material as the sheet 5, and suitably shaped, is dropped within the extended end of the tube, as indicated in Figure 7. The pitch or asphaltum on the inner face of the extended end of the tube is softened, as is also the pitch or asphaltum of the bottom piece, by means of the gas flame 9, the said flame being played around within the extended end of the tube, close to the bottom. Now by means of the mallet 10 before mentioned, the extended end of the tube indicated at 14 is turned down upon the bottom 13, and is hammered into close contact therewith, and an intimate seal is formed between the bottom and the overset end of the tube. The complete operation is shown in Figure 8, wherein the portion 14 of the tube is secured to the end piece 13. The container is now complete, and it is only necessary to remove the form. The completed container is shown in Figure 9, and it will be evident that the said containers may be made to hold any desired number of any desired size of battery. The container shown in Figure 9 is especially designed for holding four 6" cells, and the wooden strip 11 is so placed that it will come between two adjacent cells. The strip may be so arranged that it will be between the first and second, or between any other pair of cells. Since the improved container is made of waterproof material, it does not require of waterproof material, after it has been once dipping or handling, after it has been once shaped. The wooden strip 11 is provided, and the tacks 12 are used to reinforce the joint, and to prevent the pulling apart of the joint, should the container be stretched while it is being filled with the dry cells. The block need not be of the particular shape shown, but such shape is convenient, in that it fits smoothly between two round cells. The softening of the pitch or asphaltum by the flame is continued until the soft pitch oozes.

Claims to the process herein disclosed have been made in application, Serial No. 729,761, filed by applicant August 2, 1924.

I claim:

1. A container of the class described made from felt impregnated with a fusible waterproof saturant and formed into a tube with the joint welded together by fusion of the saturant at the joint under heat and pressure, and a reinforcing member at the under side of the joint, the tube being closed at its lower end to form a bottom for the container.

2. A container of the class described made from felt impregnated with a fusible waterproof saturant and formed into a tube with the joint welded together by fusion of the saturant at the joint under heat and pressure, and a strip of reinforcing material at the inner side of the joint to which the material at the joint is tacked, the tube being closed at its lower end to form a bottom for the container.

In testimony whereof I affix my signature.

WALTER B. SCHULTE.